Sept. 5, 1950          H. J. SHEA          2,521,259
POULTRY WATERING UNIT
Filed April 21, 1949          2 Sheets—Sheet 1
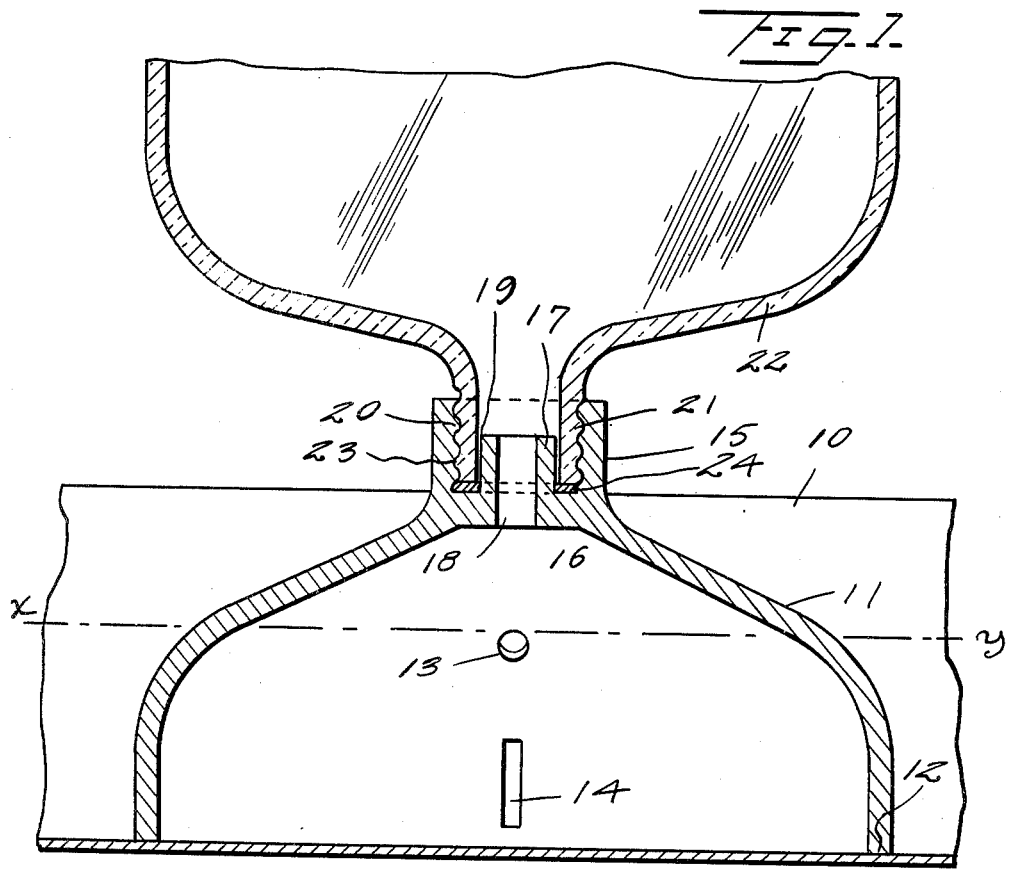
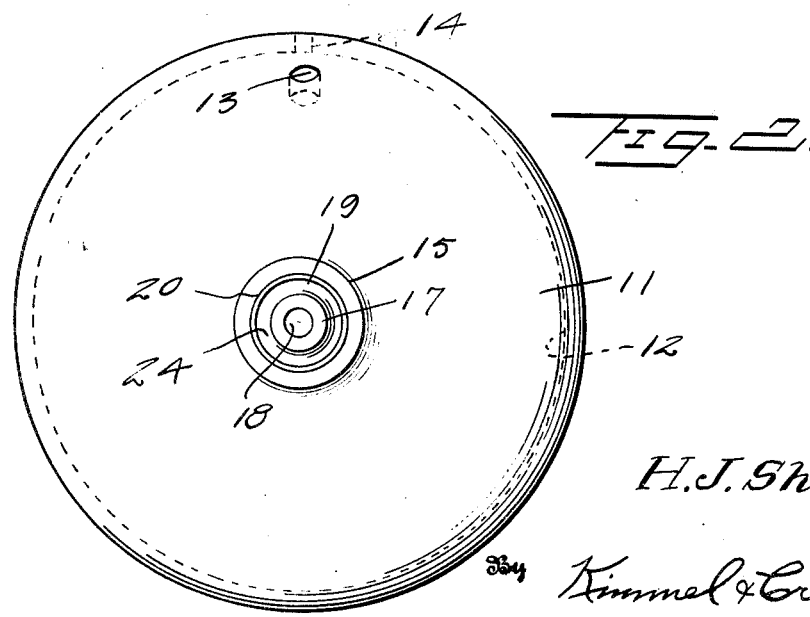
Inventor
H. J. Shea
By Kimmel & Crowell
Attorneys

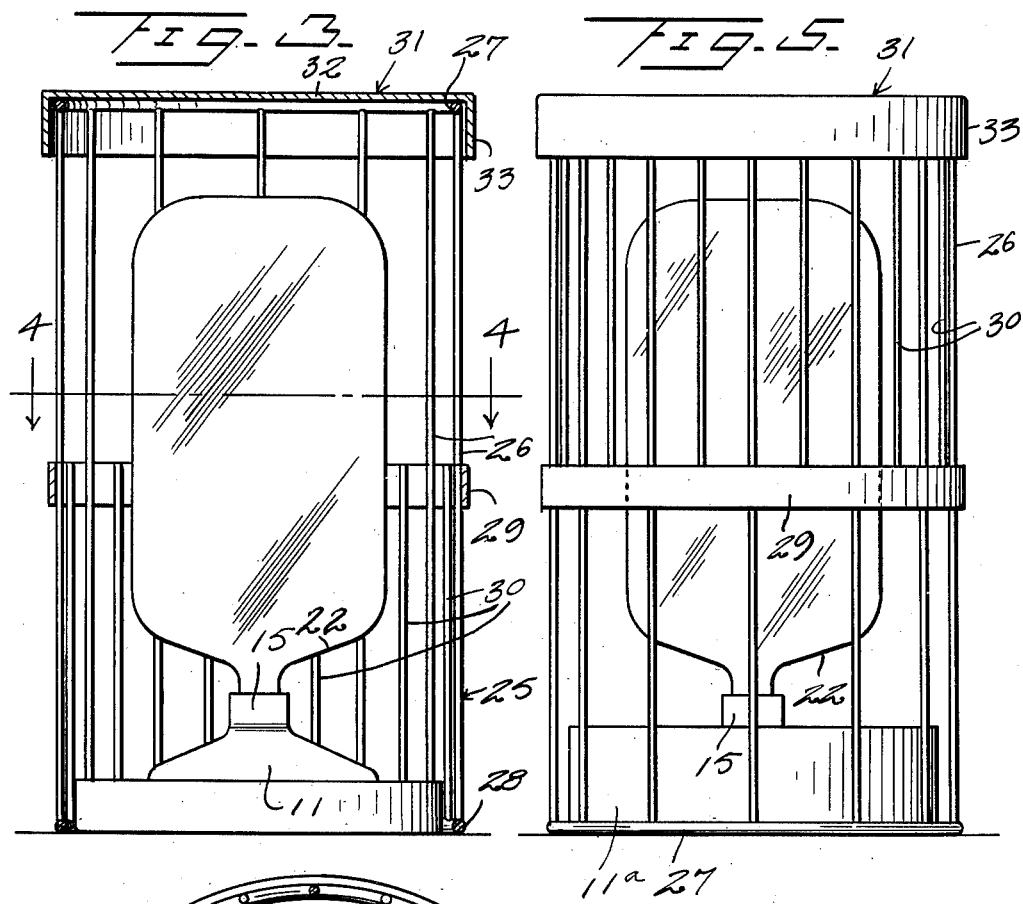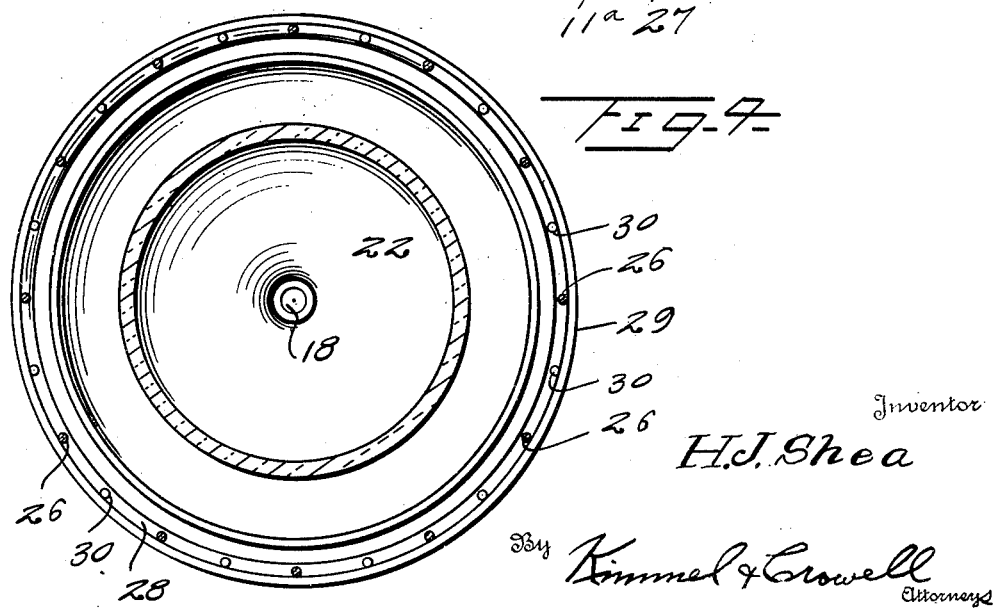

Patented Sept. 5, 1950

2,521,259

UNITED STATES PATENT OFFICE 2,521,259

POULTRY WATERING UNIT

Harry J. Shea, Dodge City, Kans.

Application April 21, 1949, Serial No. 88,757

2 Claims. (Cl. 119—77)

My invention relates to a poultry watering unit or fountain for supplying fresh clean drinking water to a trough or pan from which the poultry may drink.

An object of the invention is to provide a novel, simple and efficient poultry watering unit or fountain comprising a base having a neck with a socket or seat adapted to receive and support a jug or bottle containing water in an inverted position with the neck downward in the socket or seat and to cause the flow of water therefrom in the required quantity to maintain a constant level or depth of water in the trough or pan.

Another object is to provide means in the form of upper and lower openings in the base through which water may flow from the jug or container into a trough or pan and air may enter the jug or bottle to displace the water flowing therefrom while the lower opening facilitates such displacement by the entry of air and flow of water from the jug or bottle into the trough or pan faster than the previous drinking fountains so that the level of the water will be more quickly maintained instead of temporarily checking or stopping the flow at times due to the tendency to form a suction or vacuum within the jug to interfere with the feed of the water or requiring agitation to start the flow.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings,

Figure 1 is a vertical sectional view of a poultry watering unit or fountain embodying my invention;

Figure 2 is a top plan view of the base.

Figure 3 is a vertical section of a guard or cage disposed about the unit shown in Figures 1 and 2, Figure 4 is a sectional view taken on the line 4—4 of Figure 3, Figure 5 is a detail side elevation of the structure shown in Figure 3 with the guard inverted.

Referring to the drawings in detail, 10 designates a shallow pan or trough from which the poultry may drink. Within the pan is disposed a base 11 of glass, plastic, metal such as aluminum or other suitable non-rusting and non-corroding material with which it is safe to use antiseptics in order to clean the same and maintain it in a sanitary condition. This base is frusto conical in shape like the top portion of a jug or bottle and is open at the bottom so that the bottom edge 12 may rest upon the bottom of the pan or trough 10. At one side corresponding to the level of the water desired to be maintained in the trough or pan 10 as indicated by the line $x$—$y$, the wall of the hollow base 11 is provided with an opening therethrough shown of circular shape establishing communication between the interior of the base and the water containing space of the pan. Spaced below the opening 13 is another 14 shown as a vertically elongated slot 14 positioned a considerable distance below the opening 13 and in close proximity to the bottom edge of the base 11.

The base 11 is provided with a short annular reduced neck portion or flange 15 extending upwardly from the base and formed integral with an inwardly extending or bottom wall 16 from which an upwardly extending shorter annular neck portion or flange 17 extends in spaced relation to and concentric with the neck or flange 15 and terminating in spaced relation to the top edge of the latter. Centrally, a vertical passage or opening 18 is provided through the smaller neck portion or flange 17 and an annular space forming a concentric socket or seat 19 is provided between the neck portions or flanges 15 and 17. Preferably, the outer neck portion or flange 15 is interiorly threaded as indicated at 20 to take the exteriorly threaded downwardly extending neck portion 21 of a jug or bottle 22 of glass or the like when in an inverted position. Such jugs or bottles may be obtained in the open market at a low cost. The exterior threads 23 of the neck 21 are designed to engage the interior threads 20 of the neck or flange 15 and a rubber or other gasket 24 may be disposed in the bottom of the annular space forming the seat or socket 19 for engagement by the lower end or mouth of the neck 21 to form a cushion support and a liquid tight joint at this point.

Thus, when the jug or bottle 22 containing water is disposed in an inverted position and mounted on the base in the manner described and shown in Figure 1 of the drawings, the water may flow from the jug through the neck 21 down through the opening 18 into the base 11 and through the openings 13 and 14 through the base into the pan 10 to maintain the level of the water therein at the top of the upper opening 13 as indicated at $x$—$y$. Ordinarily, if one opening only such as 13 is provided in the wall of the base 11, the entrance of air into the jug to displace the water therein and the flow of water into the pan or trough 10 through said opening sometimes stops due to the coherence of the water with the wall of the opening and this tends to check or temporarily stop the flow in connection with the suction or tendency to form a vacuum within the jug above the water to interfere with the proper feed of the water or requiring agitation to start the flow. This is overcome by providing the opening 14 below the opening 13 and near the bottom of the base 11, which facilitates the flow and permits quick displacement of the water by entry of air into the jug through the openings so that the water will flow into the pan or trough faster than with previous drinking fountains so that the level of the water will be more quickly maintained instead of temporarily checking or stopping the flow at times or requiring agitation to start the flow. Also, the device being constructed of three simple parts including the jug or bottle which can be obtained in the open market, and the jug neck being supported in the pan above the water, does not get slick or slimy and the unit may be quickly cleaned and sterilized so that the same may be maintained in a sanitary condition and a clean fresh supply of water maintained in the pan or trough at all times. Of course, it is to be understood that when the water level reaches the top of the upper opening 13, the flow of the water from the jug to the pan is cut off and the proper level therein maintained at all times.

Referring now to Figures 3 and 4 there is disclosed a guard generally designated as 25, which is of cylindrical construction and is formed of a plurality of relatively long bars or wires 26 which are secured to upper and lower rings or annular members 27 and 28 respectively. An intermediate band or ring 29 is secured to the bars 26 substantially midway between the length thereof, and a second series of elongated bars or wires 30 are secured between the intermediate band or ring 29 and the lower ring 28. The shorter bars or wires 30 provide a reduced space between the long bars 26 and are designed to provide a cage or guard about the watering unit 11 when the small chicks are to be watered.

A cap or cover 31 is removably disposed over the upper end of the guard 25 and includes a flat top wall 32 and a cylindrical flange 33. Where larger chickens are to be watered the cage or guard 25 is reversed as shown in Figure 5, and if desired a deeper pan 11a may be placed within the lower portion of the guard 25.

I do not mean to confine myself to the exact details of construction herein disclosed, but claim all variations falling within the purview of the appended claims.

What is claimed is:

1. In a poultry watering unit adapted to support a bottle in an inverted position within a pan, comprising a hollow substantially conical base having a concentric pair of spaced annular neck portions extending upwardly therefrom and an opening therethrough within said neck portions, said neck portions forming an annular seat therebetween for receiving the neck of the bottle in inverted position above the water level in said pan, said base having an upper opening therethrough and a lower vertically elongated water discharge opening spaced from the upper opening and near the bottom thereof, said upper opening serving as an air vent whereby when the water level in said unit reaches said vent to close the same, further flow of water from said bottle is cut off until the level in said unit is reduced to again open said air vent.

2. In a poultry watering unit, a substantially frustro-conical hollow base open at the bottom having a reduced upwardly extending annular flange at the top and an inner upwardly extending flange shorter than the first flange to form an annular space therebetween closed at the bottom, there being an opening within the inner flange extending to the top of the latter and communicating with the interior of the base at the bottom, said annular space forming a seat for receiving the threaded neck of a bottle in an inverted position out of contact with the water in said pan, said base having spaced upper and lower openings therethrough, said upper opening comprising an air vent, and said lower opening a water discharge opening whereby when the water level in said unit closes said air vent, flow of water from said bottle is cut off until the water level is reduced to open said air vent, the water level in said pan thus being maintained substantially constantly and a resilient sealing gasket on the bottom of said space against which the mouth of the bottle neck seats, said outer flange being internally threaded for engagement by external threads on the bottle neck.

HARRY J. SHEA.

REFERENCES CITED

The following references are of record in the file of this patent:

UNITED STATES PATENTS

| Number | Name | Date |
|---|---|---|
| 987,551 | Chambers | Mar. 21, 1911 |
| 1,062,531 | Batz | May 20, 1913 |
| 1,553,699 | Whitman | May 5, 1925 |
| 1,838,324 | Olson | Dec. 29, 1931 |
| 1,906,016 | Stecher | Apr. 25, 1933 |
| 2,045,472 | Kearney et al. | June 23, 1936 |
| 2,364,991 | Marshall | Dec. 12, 1944 |